United States Patent [19]

Siegmund

[11] 4,231,775
[45] Nov. 4, 1980

[54] METHOD OF MAKING OMMATEAL LENSES AND PLATES

[75] Inventor: Walter P. Siegmund, Woodstock, Conn.

[73] Assignee: American Optical Corporation, Southbridge, Mass.

[21] Appl. No.: 32,323

[22] Filed: Apr. 23, 1979

[51] Int. Cl.³ .................. C03C 15/00; C03C 25/06
[52] U.S. Cl. .................... 65/30 E; 65/3 A; 65/4 B; 65/31; 350/96.31
[58] Field of Search .............. 65/2, 3 A, 4 B, 30 E, 65/31; 350/96.3, 96.31

[56] References Cited

U.S. PATENT DOCUMENTS

| | | | |
|---|---|---|---|
| 3,004,368 | 10/1961 | Hicks | 65/4 B |
| 3,455,667 | 7/1969 | Snitzer et al. | 65/4 B |
| 3,667,832 | 6/1972 | Kitano et al. | 65/4 B X |
| 3,791,806 | 2/1974 | Koizumi et al. | 65/3 A |
| 3,801,181 | 4/1974 | Kitano et al. | 65/3 A X |
| 3,843,228 | 10/1974 | Yoshiyagawa et al. | 65/31 X |
| 3,879,182 | 4/1975 | Strack | 65/37 |
| 3,941,474 | 3/1976 | Kitano et al. | 65/30 E X |
| 3,989,495 | 11/1976 | Siegmund | 65/31 |
| 4,002,452 | 1/1977 | Hopkins | 65/152 |
| 4,011,071 | 3/1977 | Siegmund | 65/31 |

*Primary Examiner*—Robert L. Lindsay, Jr.
*Attorney, Agent, or Firm*—Jeremiah J. Duggan; Alan H. Spencer; Stephen A. Schneeberger

[57] ABSTRACT

Columnar lens elements of a crossed multi-ocular array are each formed of a rectangular preform of core glass containing a modifying oxide which is clad on each of two of its opposite sides with a glass having an affinity to ions of the modifying oxide and on remaining sides with a substantially non-reactive glass, all cladding glasses being preferentially soluble relative to the core glass. The clad preform is heated and drawn to the cross-sectional size desired of the aforesaid lens elements and cut transaxially into component lengths equal to or greater than desired for the array. A multiplicity of the cut components are tightly juxtapositioned, heated for diffusion of oxide ions into the first mentioned cladding glasses, cooled, annealed and leached free of all claddings for final crossed assembly.

10 Claims, 8 Drawing Figures

METHOD OF MAKING OMMATEAL LENSES AND PLATES

BACKGROUND OF THE INVENTION

1. Field of the Invention

This invention relates to gradient refractive index devices with particular reference to improvements in method of making columnar gradient refractive index lens elements for ommateal lenses or face plates.

2. Discussion of the Prior Art

A variation of the radially graded multi-ocular lens or face plate component is the "cylindrical" gradient power columnar element in which the refractive index gradient extends transaxially, i.e. from the element axis toward its opposite side, and is substantially uniform from front to back at each increment of gradation. This basic configuration has been described in U.S. Pat. No. 3,667,832.

The manufacture of such a lens or face plate component has, however, involved tedious, costly and usually less than accurately continuously reproducible processing techniques which, for example, involve the exposure of a side of a glass plate to an oxide modifying salt for ion exchange and cutting of the thus treated plate into a multiplicity of lens components of proper size and shape, each requiring grinding and optical polishing of the cut surfaces prior to final assembly.

Typical prior art cycles for ion exchange processing require as many as hundreds of hours using generally messy and difficult to handle ion exchange agents, added to which are the aforesaid costly and time consuming article cutting and element-by-element surface finishing operations.

In the interest of simplifying gradient refractive index ommateal lens manufacturing operations and reducing end product cost, this invention is directed more particularly to the manufacture of "cylindrical" columnar lens elements with a principal objective of avoidance of heretofore difficult to handle and messy ion exchange agents, lengthy processing schedules, tedious surface finishing operations, and general costliness.

Another object is to provide for simple, efficient and high quality volume production of the aforesaid lens elements with low investment in capital equipment; and still another object is to accomplish mass production with an assurance of accurate repetition of article parameters and quality of finish.

Other objects and advantages of the invention will become apparent from the following description.

SUMMARY OF THE INVENTION

The foregoing objectives and their corollaries are accomplished by constructing a clad preform of glass containing a modifying oxide and having the geometrical, e.g. rectangular, cross-sectional configuration desired of columnar lens elements to be produced according to this invention. The cladding comprises two preselected types of glass, both being preferentially soluble relative to the core glass. One of the cladding glasses is selected to have an affinity to ions of the aforesaid modifying oxide and is placed against each of two opposite sides of the preform while the other cladding glass is selected to be of a type which is non-reactive with the modifying oxide and is placed against remaining sides of the preform. The clad preform is zonally heated and drawn to the cross-sectional size desired of the columnar lens elements to be formed and cut transaxially into lens component lengths, or longer. The cut components are tightly juxtapositioned, heated for rapid diffusion of modifying oxide ions into the first mentioned cladding glasses, cooled, annealed and leached free of all claddings for final crossed assembly.

Details of the invention will become more readily apparent from the following description when taken in conjunction with the accompanying drawings.

IN THE DRAWINGS

Figure 7:
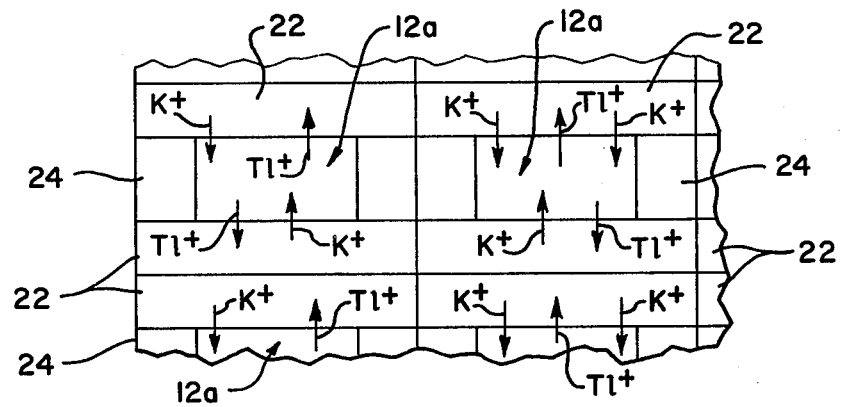

FIG. 7 diagrammatically illustrates the ion exchange process; and

Figure 8:
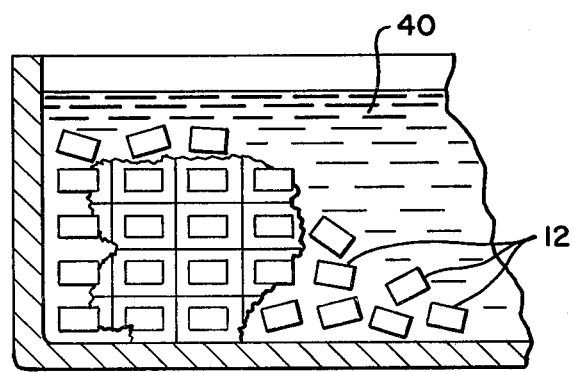

FIG. 8 is a partially cross-sectioned illustration of a step of the present process which frees the ion exchanged lens elements from their supporting claddings.

DESCRIPTION OF THE PREFERRED EMBODIMENTS

Figure 1:
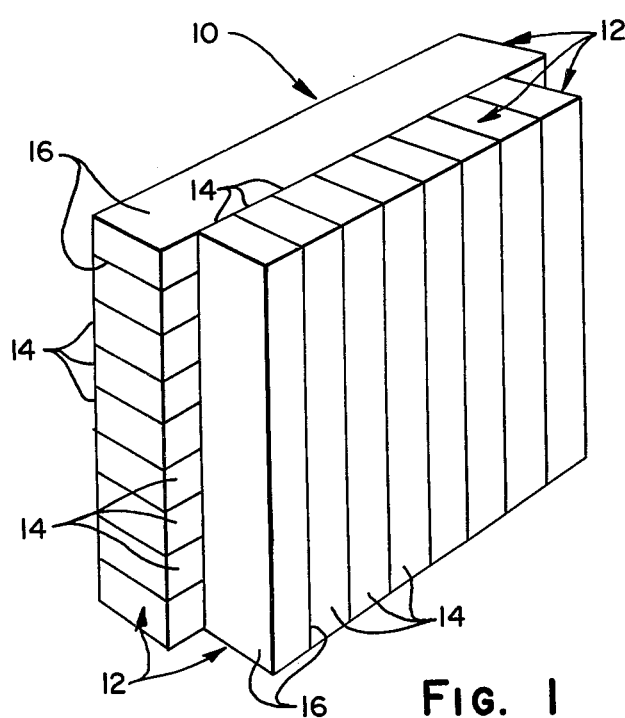
FIG. 1 is an illustration, in perspective, of an optical plate formed of crossed columnar lens elements produced according to the invention.

Referring to the drawings, there is illustrated in FIG. 1 a form of ommateal lens or face plate 10 having crossed columnar lenses 12 of a type having particular pertinence to this invention.

Figure 2:
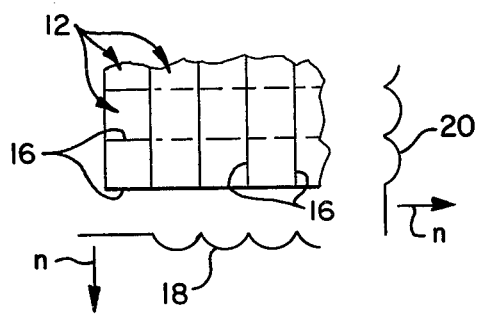
FIG. 2 is a fragmentary front elevational view of the optical plate with diagrammatic illustration of its refractive index profile.

Lenses 12 each comprise a rectangular column of glass having flat optically finished opposite faces 14 and a "cylindrical" refractive index gradation extending parallel to faces 14 between sides 16. The refractive index gradation is substantially uniform from front to back, i.e. between faces 14, at each increment of gradation and provides the cylindrical profile illustrated in FIG. 2 with line 18 for vertical lenses 12 and line 20 for horizontal lenses 12. By such means, the crossed cylindrical gradient adds to an equivalent "spherical lens" gradation, the latter providing the desired multi-ocular or ommatidial affect.

Those interested in greater details of this basic lens or plate configuration and/or variations thereof may refer to U.S. Pat. No. 3,667,832.

Referring more particularly to details of the present invention which is especially directed to the manufacturer of gradient refractive index lenses of the columnar type, there is first prepared a preform 12a of optical core glass having a composition which includes mobile ions, e.g. $Tl^+$ (thallium), which can migrate to a neighboring glass at elevated temperatures. The preform 12a is clad along each of opposite sides 16a with a glass piece 22 having an affinity to the mobile ions of preform 12a, e.g. a glass containing mobile ions such as $K^+$ (potassium) which can replace optically "denser" Tl ions lost from preform 12a.

Shorter faces 14a of preform 12a are optically ground, polished and clad with pieces 24 of a glass which is preferably similar to the glass of preform 12a or insofar as possible, identical with regard to its diffusion characteristics for the K+ ion or other migrating ion from cladding pieces 22.

All cladding pieces 22 and 24 are constituted of components which are rendered preferentially soluble relative to the glass of preform 12a in weak acids or other solvents.

Figure 4:
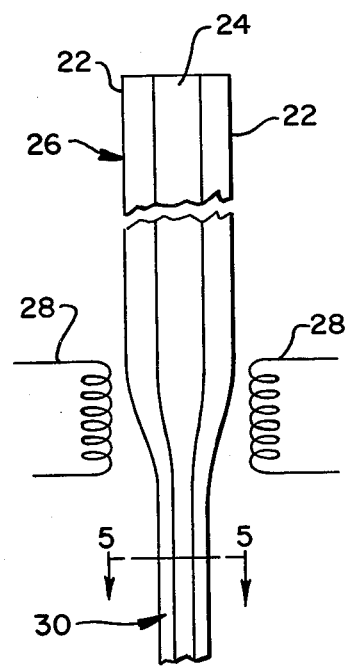
FIG. 4 is a diagrammatic illustration of an operation of zonally heating and drawing a clad preform to reduced cross-sectional size.
Figure 5:
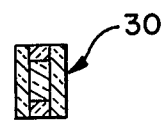
FIG. 5 is a cross-sectional view taken along line 5—5 of FIG. 4.

The assembly 26 of preform 12a and cladding pieces 22, 24 which may be lightly fused together, cemented or clamped, is zonally heated with appropriate heating elements 28 and drawn sufficiently to provide a section 30 (FIGS. 4 and 5) within which the preform 12a is brought to the cross-sectional size desired of lenses 12 (FIG. 1).

Figure 6:
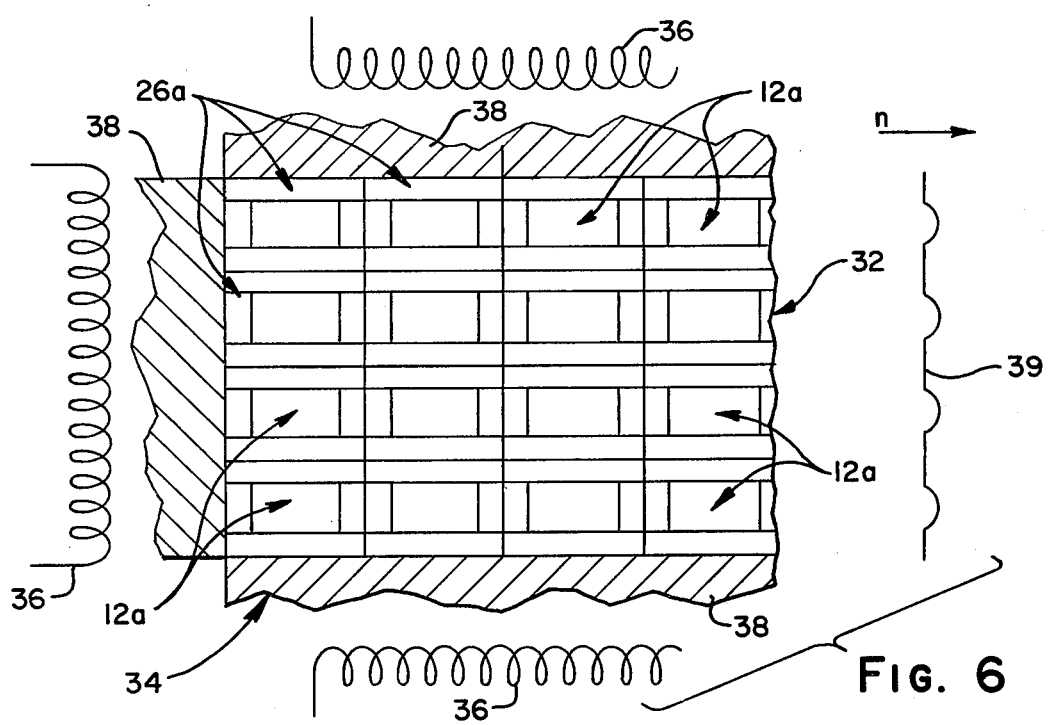
FIG. 6 illustrates a step of bundling and heating a multiplicity of drawn components for ion exchange treatment.

Section 30 is next cut into a multiplicity of shorter lengths and/or reproduced a number of times necessary to form elements 26a of bundle 32 (FIG. 6).

Bundle 32 is formed in or transferred to fusing press 34 which is adapted to be heated, e.g. with heating coils 36. In a preferred embodiment of press 34, its sides 38 (only three of six being shown) are adapted to be forced against bundle 32 with equal high pressure to create an isostatic compression force upon bundle 32 of, for example, 1000 to 5000 psi.

Bundle 32 with the aforesaid isostatic pressure applied is preferably heated to above the deformation temperature of preforms 12a for rapid interdiffusion of Tl+ and $K^{30}$ ions as diagrammatically illustrated in FIG. 7, it being noted that in view of the use of the non-reactive glasses of cladding pieces 24, ion exchange takes place only in the direction of the arrows in FIG. 7 so as to produce in each drawn preform 12a which is to become a one of lenses 12, the above described "cylindrical" refractive index gradient, e.g. as illustrated with profile 39 (FIG. 6).

Those interested in details of apparatus suitable for performing the above high pressure ion exchange treatment may refer to U.S. Pat. No. 4,002,452, for example. This patent illustrates a heating cycle comprising a "ramp" of increasing temperatures which will affect ion exchange according to this invention.

After ion exchange treatment, bundle 32 is cooled to an annealing temperature and annealed, e.g. as is also illustrated in U.S. Pat. No. 4,002,452. The resulting fused bundle 32 is removed from press 34 and immersed in a leaching medium, e.g. acid 40 (FIG. 8) until all lenses 12 become separated from one another and rendered free of claddings 22 and 24. Lenses 12 are then removed from acid 40 and cleaned with water and/or steam or other suitable cleansing means, e.g. as taught in one or more of U.S. Pat. Nos. 3,004,368; 3,624,816 and 3,674,452 which deal with such matters. This renders the gradient refractive index lenses ready for immediate crossed assembly as face plate 10 or variations thereof which may be seen in U.S. Pat. No. 3,667,832.

In the matter of compositions of glasses suitable for components 12a, 22 and 24 of assembly 26 and the drawing of section 30 therefrom, the latter may be accomplished by many of the techniques well known and used in the field of fiber optics. These details may be found in U.S. Pat. Nos. 3,455,667; 3,879,182; 3,989,495 and 4,011,071.

Figure 3:
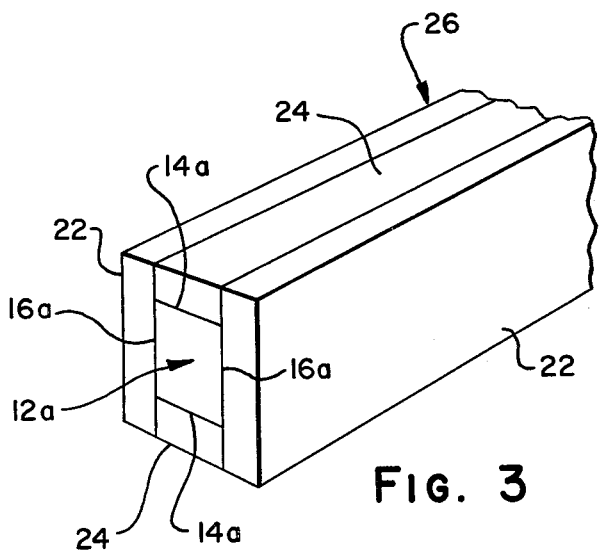
FIG. 3 is a fragmentary perspective illustration of a glass clad glass preform from which lens elements are produced according to the invention.

Compositions of glasses suitable for preform 12a (FIG. 3) may be found in U.S. Pat. No. 3,941,474 (Column 22, Table 4) and/or U.S. Pat. No. 3,801,181 (Example 1, Column 7; Example 5, Column 8; and Example 6, Column 9).

Cladding pieces 24 may be formed of a similar glass but with a high boron content which renders it preferably soluble relative to the glass of preform 12a. A borosilicate glass of the following composition may also be used:

|  | Weight % |
|---|---|
| $SiO_2$ | 12.7 |
| $B_2O_3$ | 17.2 |
| BaO | 46 |
| $Al_2O_3$ | 2 |
| $La_2O_3$ | 12 |
| $ThO_2$ | 9.6 |
| $As_2O_3$ | .5 |

Glass compositions suitable for the soluble (leachable) cladding pieces 22 include the following:

| | EXAMPLES IN WT. % | | | | | |
|---|---|---|---|---|---|---|
| | A | B | C | D | E | F |
| $La_2O_3$ | 8.0 | / | / | / | / | / |
| $B_2O_3$ | 50.0 | / | / | / | / | / |
| CaO | / | / | / | / | 5.5 | 5.5 |
| $SiO_2$ | / | 41.5 | 41.5 | 36.5 | 38.0 | 38.0 |
| $Al_2O_3$ | / | / | / | / | / | 1.0 |
| $Na_2O$ | / | 5.4 | 5.4 | / | / | / |
| PbO | / | / | 10.0 | 49.5 | / | / |
| BaO | 32.0 | 34.5 | 24.5 | / | 38.3 | 38.3 |
| K20 | 10.0 | 18.6 | 18.6 | 8.6 | 6.7 | 4.7 |
| ZnO | / | / | / | / | 4.5 | 4.5 |
| MgO | / | / | / | 5.4 | 5.0 | 5.0 |
| $Y_2O_3$ | / | / | / | / | / | 1.0 |
| $Sb_2O_3$ | / | / | / | / | 2.0 | 2.0 |

With selected combinations of the aforesaid or similar glasses for preform 12a and claddings 24, 26, ion exchange in preform 12a may be effected with temperatures of from 540° C. to 640° C. applied to bundle 32 and held for a period of from approximately 5 to 30 minutes. A particular time-temperature cycle may be approximately 10 minutes at 600° C.

From the foregoing, it can be seen that gradient refractive index columnar lenses 12 may be readily massed produced, i.e. in bundles, with ion exchange treatment effected rapidly at above lens 12 deformation temperatures.

Various modifications and adaptation of the precise form of the invention herein described may be made to suit particular requirements and, accordingly, it is intended that all such modifications which incorporate the novel concept disclosed are to be construed as coming within the scope of the claims or the range of equivalency to which they're entitled in view of the prior art.

I claim:

1. The method of making a unidirectionally graded refractive index columnar lens element comprising:
   preparing an elongated lens preform of optical glass having a composition which includes a modifying oxide, said preform being of rectangular cross-sectional shape and having a pair of optically finished sides, one opposite the other;
   positioning against each of said optically finished sides a piece of a first cladding glass which is preferentially soluble relative to the glass of said preform and substantially non-reactive with said modifying oxide;

positioning against each of remaining sides of said preform a piece of a second cladding glass which is also preferentially soluble relative to the glass of said preform but has an affinity to ions of said modifying oxide;

zonally heating and drawing the assembly of said preform and all cladding pieces sufficiently to bring at least a portion of said preform to the cross-sectional size desired of said lens element substantially without alteration of said rectangular shape of said preform;

substantially uniformly heating said portion of said preform and corresponding portions of said cladding pieces to a temperature and for a time sufficient to effect extraction of ions of the modifying oxide substantially only into said second cladding glasses;

cooling and annealing said portion of said preform; and leaching all cladding glasses away from said portion of said preform whereby said portion constitutes said unidirectionally grades refractive index lens element.

2. The method according to claim 1 including the application of high isostatic pressure to said drawn portion of said preform and corresponding portions of said cladding pieces during said step of surface heating for said extraction of ions of said modifying oxide, and removing said high isostatic pressure following said step of cooling said portion of said preform.

3. The method according to claim 1 wherein said modifying oxide is thallium oxide and said second cladding glass comprises a composition containing a substantial proportion of potassium oxide whereby said substantially uniform heating of said portion of said preform and cladding pieces effects interdiffusion of Tl+ and K+ ions through contacting surfaces of said glass of said preform and said second cladding glasses.

4. The method according to claim 1 wherein said leaching of all cladding glasses away from said portion of said preform is effected in an acid and said resulting graded refractive index lens element is cleaned of residue of said acid following said step of leaching.

5. The method of mass producing unidirectionally graded refractive index columnar lens elements comprising:

preparing an elongated lens element preform of optical glass having a composition which includes a modifying oxide, said preform being of rectangular cross-sectional shape and having a pair of optically finished sides, one opposite the other;

positioning against each of said optically finished sides a piece of a first cladding glass which is preferentially soluble relative to the glass of said preform and substantially non-reactive with said modifying oxide;

positioning against each of remaining sides of said preform a piece of a second cladding glass which is also preferentially soluble relative to the glass of said preform but has an affinity to ions of said modifying oxide;

zonally heating and drawing the assembly of said preform and all cladding pieces sufficiently to bring at least a portion of said preform to the configuration of a long element of the cross-sectional size desired of said lens element substantially without alteration of said rectangular shape of preform;

dividing said long element into a number of shorter lengths;

bundling said shorter lengths of said element together;

applying a high substantially isostatic compressing force to said bundle and heating same to a temperature above the deformation temperature of said glass of said preform for a period of time sufficient to effect extraction of ions of said modifying oxide substantially only into said second cladding pieces of said drawn assembly;

cooling and annealing said bundle;

removing said applied pressure; and leaching said cladding glasses away from said drawn preform glasses whereby said remaining preform glasses constitute said mass produced unidirectionally graded refractive lens elements.

6. The method according to claim 5 wherein said modifying oxide is thallium oxide and said second cladding pieces comprise a glass containing a substantial proportion of potassium oxide.

7. The method according to claim 6 wherein said step of heating said drawn portion of said preform and corresponding cladding pieces effects interdiffusion of Tl+ and K+ ions through contacting surfaces of said glasses of said preforms and said second cladding glasses.

8. The method according to claim 5 wherein said cladding pieces are leached away from said drawn portions of said preform in an acid and said leached portions of said preform are cleaned of residue of said acid following said step of leaching.

9. A multi-ocular array of crossed columnar lens elements each produced according to the method of claim 1.

10. A crossed multi-ocular array of columnar lens elements mass produced according to the method of claim 5.

* * * * *